United States Patent

[11] 3,613,645

| [72] | Inventor | Armand Froumajou<br>Pontoise, France |
|---|---|---|
| [21] | Appl. No. | 878,068 |
| [22] | Filed | Nov. 19, 1969 |
| [45] | Patented | Oct. 19, 1971 |
| [73] | Assignees | Automobiles Peugeot<br>Paris, France;<br>Regie Nationale des Usines Renault<br>Billancourt, France |
| [32] | Priority | Dec. 2, 1968 |
| [33] | | France |
| [31] | | 176,181 |

[54] ACCESSORY UNIT FOR AN ENGINE OF A VEHICLE AND AN ENGINE EQUIPPED WITH SAID UNIT
6 Claims, 5 Drawing Figs.

[52] U.S. Cl. ................................................. 123/41.46,
123/41.65, 123/195 A, 180/54 R, 184/6, 184/28
[51] Int. Cl. ......................................................F02m 67/00,
F02m 77/00, B60k 11/04
[50] Field of Search .......................................... 123/41.49,
195 A, 195, 41.65; 184/6 Y; 180/54, 54 A, 54.4,
55, 56

[56] References Cited
UNITED STATES PATENTS

| 1,416,490 | 5/1922 | Monsen | 184/6 Y UX |
|---|---|---|---|
| 1,422,995 | 7/1922 | Link | 123/195 A |
| 2,032,876 | 3/1936 | Haltenberger | 180/54 A UX |
| 2,159,332 | 5/1939 | Lee | 180/54.4 |
| 2,568,473 | 9/1951 | Tucker | 123/195 A |
| 2,644,541 | 7/1953 | Bachle | 180/54 A |
| 2,862,484 | 12/1958 | Haas et al. | 123/195 A X |
| 3,087,582 | 4/1963 | Potter | 184/6 Y UX |
| 3,186,507 | 6/1965 | Dangauthier | 180/54.4 X |
| 3,302,740 | 2/1967 | Giacosa | 180/54.4 X |
| 3,338,229 | 8/1967 | De Lorean et al. | 123/195 A |

*Primary Examiner*—Al Lawrence Smith
*Attorney*—Burns, Doane, Swecker & Mathis

ABSTRACT: An accessory unit for mounting on a vehicle engine. The unit comprises a body relative to which are mounted component accessories of said engine. The body is adapted to be fixed to a corresponding face of the engine. Drive means are provided whereby said accessories can be driven by the crankshaft of the engine.

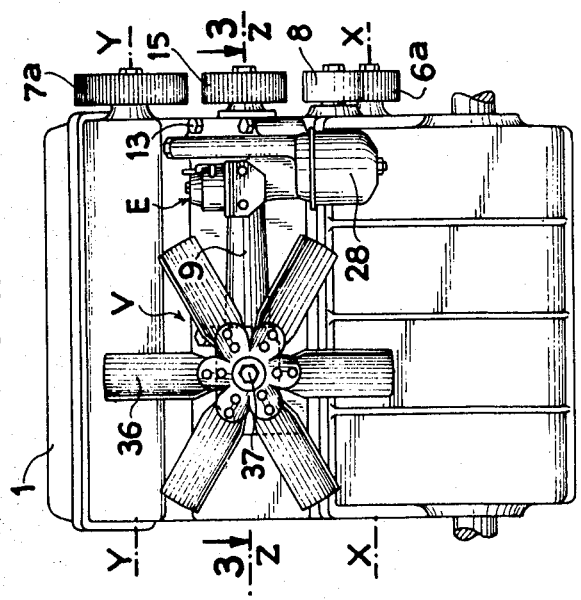
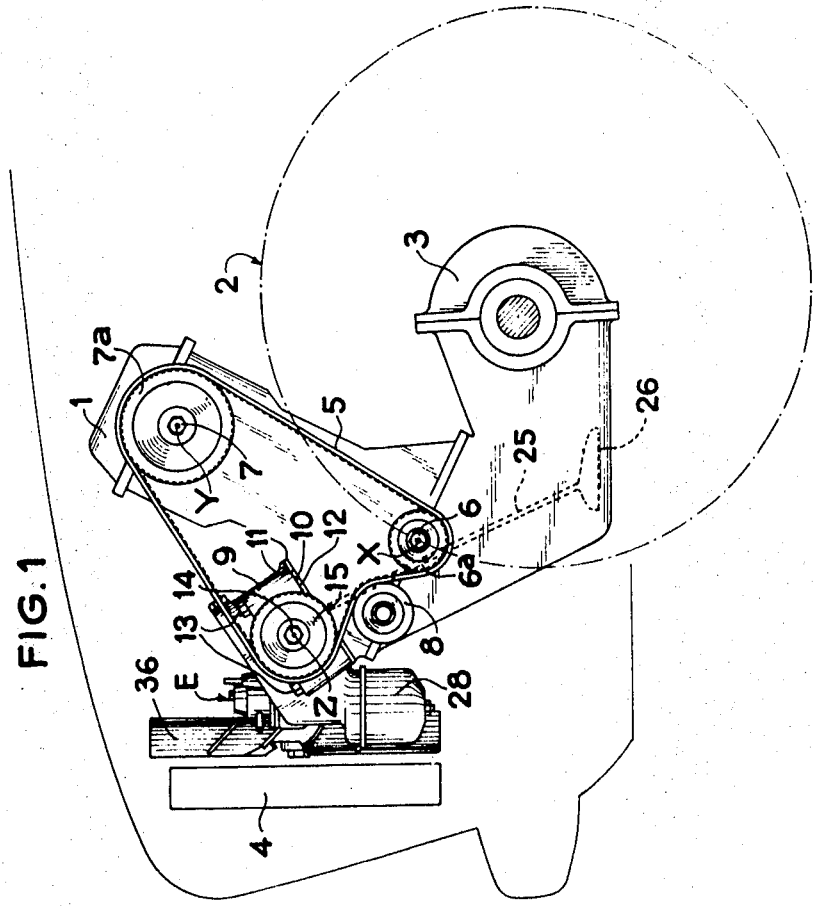

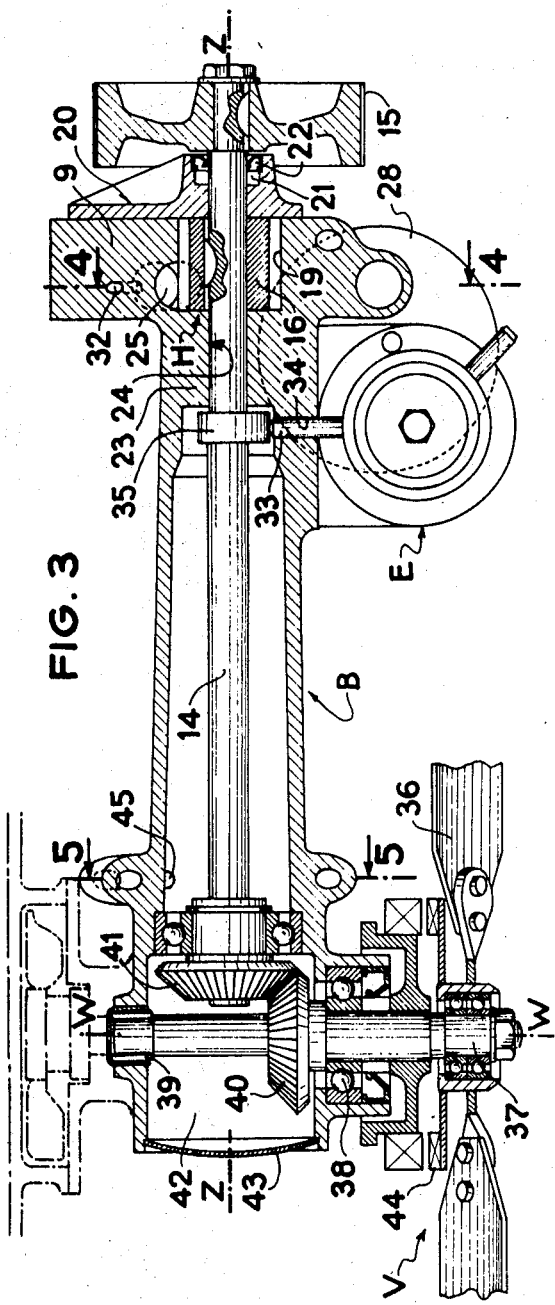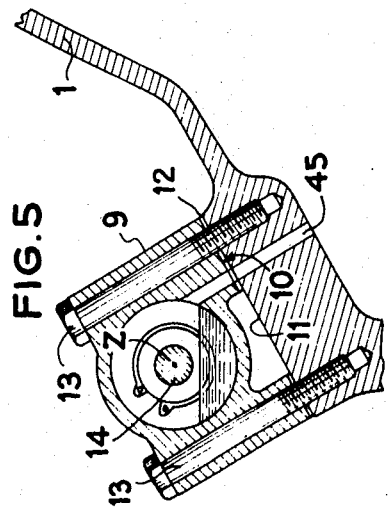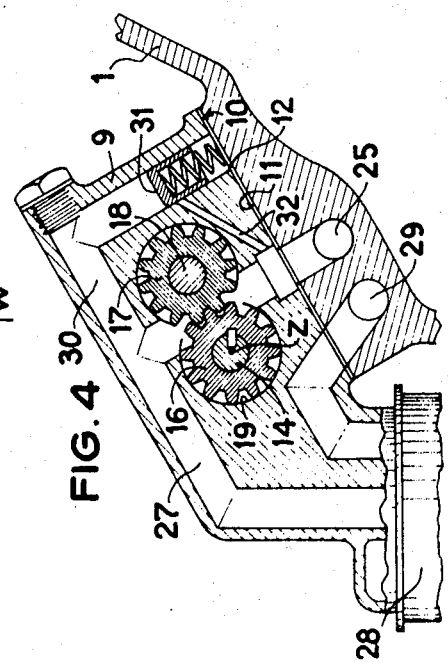

ACCESSORY UNIT FOR AN ENGINE OF A VEHICLE AND AN ENGINE EQUIPPED WITH SAID UNIT

The present invention relates to the arrangement of various accessories on an engine of an automobile vehicle and in particular on an engine which is disposed transversely of the direction of movement of the vehicle.

It is known that usually, to obtain optimum cooling, it is desirable that the radiator of the cooling circuit of an engine be disposed in a plane perpendicular to the direction of movement of the vehicle, the fan being disposed parallel to and to the rear of the radiator. Now, if this arrangement is to be adopted in a vehicle having a transverse engine, difficulties are met with in the driving of the fan by the crankshaft since the axes of the crankshaft and fan are roughly orthogonal. In particular, if a transmission belt is employed, it must have a complex path and this requires the utilization of one or more belt pulleys. Another solution is to drive the fan by an auxiliary electric motor, but this is costly and affords only limited power.

The object of the invention is to overcome these various drawbacks.

The invention provides an accessory unit for a vehicle engine, said unit comprising a body in and/or on which are mounted accessories, such as a fan, oil pump, petrol pump, water pump; means for fixing the unit to a corresponding face of the engine and a drive device whereby said accessories can be driven by the crankshaft of the engine.

Another object of the invention is to provide an automobile vehicle engine equipped with an accessory unit such as that defined hereinbefore.

Further features and advantages of the invention will be apparent from the ensuing description with reference to the accompanying drawings In the drawings:

FIG. 1 is a diagrammatic side elevational view of the front part of an automobile vehicle having a transverse engine;

FIG. 2 is a front elevational view of the engine, the radiator having been removed;

FIG. 3 is a horizontal sectional view taken along line 3—3 of FIG. 2;

FIG. 4 is a cross-sectional view taken along line 4—4 of FIG. 3, and

FIG. 5 is a cross-sectional view taken along line 5—5 of FIG. 3.

With reference to FIG. 1, there is shown at 1 the general shape of the engine which is located in the front part of a vehicle and disposed transversely of the direction of movement of the latter. This engine drives, in the known manner, the front wheels 2 through a differential 3. The radiator 4 of the cooling circuit is disposed transversely of the vehicle.

The distributor is driven, in the known manner, by a toothed belt 5 located outside the engine 1. This belt 5 transmits the movement between a pulley or sprocket wheel $6^a$ which is keyed on the end of the crankshaft 6 and has an axis X—X and a pulley or sprocket $7^a$ keyed on the end of a camshaft 7 and having an axis Y—Y. The belt is held taut by means of a tension pulley 8.

According to the invention, an accessory or equipment unit B is placed outside the engine 1 in the region of the front part of the latter. This unit B mainly comprises a body 9 which is applied by its face 10 against a corresponding face 11 on the engine 1 with the interposition of a gasket 12. The unit B is secured to the engine by screws 13.

Rotatably mounted in the body 9 is a shaft 15 having an axis Z—Z parallel to the axis X—X of the crankshaft. Keyed on one end of the shaft 14 outside the unit B is a gear 15 which is driven by the crankshaft through the distributor belt 5.

The component parts or elements grouped in and on the accessory unit B comprise, in the illustrated embodiment, the oil pump H, the petrol pump E and the fan V.

The oil pump H is of the gear type and comprises a driving gear 16 keyed on the shaft 14 and a driven gear 17 which is free to rotate on a shaft 18 integral with the body 9. The gears 16 and 17 are disposed in a cavity 19 in the body 9 which is closed, on one side, by a cover 20, constituting a bearing for the shaft 14 and comprising a sealing element 22, and, on the other side, by a wall 23 having a bore 24 for the passage of the shaft 14. A chamber 21, communicating by way of a conduit (not shown) with the crankcase or sump of the engine, collects the leakages of oil and this avoids putting the sealing element 22 under pressure.

The oil is drawn from the bottom of the crankcase or sump by way of a conduit 25 terminating in a strainer 26 and is discharged by way of a conduit 27 to a filtering cartridge 28 secured to the body 9. At the outlet of the filter the oil is pumped by way of a conduit 29 to the lubricating circuit. Connected in parallel to the delivery conduit 27 is a conduit 30 leading to a release valve 31 which is incorporated in the body 1 and permits the return of the oil to the suction conduit 25, by way of a conduit 32, when the pressure and flow are sufficient.

The petrol pump E is of conventional type and fixed laterally to the body 9. It is actuated by a pushrod 33 which slides in a bore 34 in the body 9 and bears against a cam 35 carried by the shaft 14. Rotation of the shaft 14 reciprocates the push-rod and this actuates the pump.

The fan V comprises a propeller 36 mounted on a shaft 37 whose axis W—W is parallel to the axis of movement of the vehicle and therefore perpendicular to the shaft 14. The shaft 37 is carried by a ball bearing 38 and a needle bearing 39 and it is connected to rotate with a bevel gear 40 which is driven by a corresponding bevel gear 41 keyed on the end of the shaft 14. The bevel gears are located in a chamber 42 in the body 9 closed by a cover 43.

The propeller 36 of the fan V can either be directly keyed to the shaft 37 or driven in the known manner through a declutchable device 44 whose actuation is related to the temperature of the cooling liquid.

The body 9 is lubricated internally by the leakages of oil from the pump H between the shaft 14 and the bore 24 which does not have a sealing element. This oil thereafter returns to the crankcase of the engine by way of the conduit 45 (FIG. 5) whose end is located inside the body 9 at such level that a certain amount of oil always remains therein.

In the embodiment just described, it was assumed that the water pump of the cooling circuit does not form part of the accessory unit. However, it must be understood that the scope of the invention is intended to embrace the case where the water pump is placed in the conventional manner on the same shaft as the fan, as shown in phantom lines on FIG. 3.

It can be seen that the unit just described permits regrouping in a compact assembly, a plurality of the accessories or component parts of the engine, such as the fan, oil pump, petrol pump and water pump, the separate driving of which creates difficulties and drawbacks particularly in the case of a transverse engine. In the arrangement according to the invention, all these accessories can be driven simultaneously by the crankshaft of the engine through a single transmission which can also drive the distributor of the engine.

This obvious simplification of the assembly is accompanied by appreciable reduction in cost and saving in space.

Although a specific embodiment of the invention has been described, many modifications and changes may be made therein without departing from the scope of the invention.

Having now described my invention what I claim and desire to secure by Letters Patent is:

1. An accessory unit for mounting on a vehicle engine having a crankshaft, said unit comprising a body relative to which are mounted component accessories of said engine, said accessories comprising an oil pump, a petrol pump and a fan, means for fixing the unit to a corresponding face of the engine, a shaft which has an axis adapted to be disposed parallel to the axis of said crankshaft and is adapted to be driven by said crankshaft, said shaft being rotatably mounted in said body and carrying a gear of said oil pump which is of the gear type, a cam for actuating said petrol pump and a bevel gear meshed with a bevel gear integral with a secondary shaft drivingly connected to said fan.

2. An accessory unit as claimed in claim 1, wherein said body has an oil filter mounted thereon.

3. An accessory unit as claimed in claim 1, comprising an oil pump having intermeshing gears, cavities in said body receiving said gears, an intake conduit and a delivery conduit in said body for the oil pump, an oil filter inserted in said delivery conduit, said body further comprising a chamber in which is disposed a valve and a discharge conduit which is capable of putting said delivery conduit in communication with said inlet conduit under predetermined operational conditions.

4. An accessory unit as claimed in claim 3, comprising means for producing a leakage from the oil pump for lubricating the accessories disposed in the body, and a conduit for returning the leakage oil to the engine and ensuring that a predetermined oil level exists within the body.

5. An accessory unit as claimed in claim 1, further comprising a water pump combined with said secondary shaft to be driven.

6. A structure comprising in combination a vehicle engine comprising a face which is substantially plane and an accessory unit having a body relative to which component accessories of said engine are mounted, said accessories comprising an oil pump, a petrol pump and a fan, means fixing said unit to said face, a shaft which has an axis adapted to be disposed parallel to the axis of said crankshaft and is adapted to be driven by said crankshaft, said shaft being rotatably mounted in said body and carrying a gear of said oil pump which is of the gear type, a cam for actuating said petrol pump and a bevel gear meshed with a bevel gear integral with a secondary shaft drivingly connected to said fan, and said unit comprising conduits communicating with said accessories and said engine having conduits opening onto said face in alignment with said conduits of said unit.